United States Patent
Hajir et al.

(10) Patent No.: US 12,133,189 B2
(45) Date of Patent: Oct. 29, 2024

(54) METHODS FOR RADIO RESOURCE MANAGEMENT IN MOVING NETWORKS

(71) Applicant: INTERDIGITAL PATENT HOLDINGS, INC., Wilmington, DE (US)

(72) Inventors: Mouna Hajir, Montreal (CA); Dylan James Watts, Montreal (CA); Yugeswar Deenoo, Chalfont, PA (US); Ghyslain Pelletier, Montreal (CA)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 388 days.

(21) Appl. No.: 17/429,002

(22) PCT Filed: Feb. 6, 2020

(86) PCT No.: PCT/US2020/017033
§ 371 (c)(1),
(2) Date: Aug. 6, 2021

(87) PCT Pub. No.: WO2020/163610
PCT Pub. Date: Aug. 13, 2020

(65) Prior Publication Data
US 2022/0030532 A1 Jan. 27, 2022

Related U.S. Application Data

(60) Provisional application No. 62/802,087, filed on Feb. 6, 2019.

(51) Int. Cl.
*H04W 56/00* (2009.01)
*H04B 7/185* (2006.01)
(Continued)

(52) U.S. Cl.
CPC ...... *H04W 56/006* (2013.01); *H04B 7/18513* (2013.01); *H04W 24/10* (2013.01); *H04W 84/06* (2013.01)

(58) Field of Classification Search
CPC ... H04W 56/006; H04W 24/10; H04W 84/06; H04B 7/18513
See application file for complete search history.

(56) References Cited

U.S. PATENT DOCUMENTS

| 9,730,138 B2 | 8/2017 | Wang et al. |
| 10,412,571 B2 * | 9/2019 | Baghel ................. H04W 76/14 |

(Continued)

FOREIGN PATENT DOCUMENTS

| CN | 101674648 B | 1/2013 |
| WO | 2001095642 A2 | 12/2001 |
| WO | 2016179037 A1 | 11/2016 |

OTHER PUBLICATIONS

CATT, "Mobility Issue for NTN System," 3GPP TSG-RAN WG2 Meeting #104, R2-1816281, Spokane, USA, (Nov. 12-16, 2018).
(Continued)

*Primary Examiner* — Chi H Pham
*Assistant Examiner* — Weibin Huang
(74) *Attorney, Agent, or Firm* — Volpe Koenig

(57) ABSTRACT

A wireless transmit/receive unit (WTRU) may communicate in a non-terrestrial network (NTN) comprising a plurality of satellites. The WTRU may be preconfigured with a plurality of measurement configurations and a corresponding plurality of activation/deactivation criteria associated with the plurality of satellites. The activation/deactivation criteria includes at least activation timing information. The WTRU may activate and deactivate each of the plurality of measurement configurations over time in accordance with the activation/deactivation criteria. The WTRU may perform
(Continued)

measurements on cell beams for satellites with active measurement configurations and report results based on the measurements to NTN.

24 Claims, 14 Drawing Sheets

(51) Int. Cl.
*H04W 24/10* (2009.01)
*H04W 84/06* (2009.01)

(56) References Cited

U.S. PATENT DOCUMENTS

| | | | |
|---|---|---|---|
| 2010/0061338 A1* | 3/2010 | Ji | H04W 36/326 370/331 |
| 2016/0192226 A1 | 6/2016 | Lundstedt et al. | |
| 2018/0077529 A1* | 3/2018 | Ryu | H04W 64/006 |
| 2020/0120563 A1* | 4/2020 | Takács et al. | H04B 7/18502 |
| 2020/0145981 A1* | 5/2020 | Harada | H04W 72/044 |
| 2021/0112473 A1* | 4/2021 | Martin | H04W 24/08 |
| 2022/0086671 A1* | 3/2022 | Hong | H04W 16/28 |
| 2022/0086713 A1* | 3/2022 | Määttänen et al. | H04W 36/00837 |

OTHER PUBLICATIONS

IEEE Standard for Information technology—Telecommunications and information exchange between systems Local and metropolitan area networks—Specific requirements; Part 11: Wireless LAN Medium Access Control (MAC) and Physical Layer (PHY) Specifications, IEEE Std. 802.11-2016 (Dec. 7, 2016).
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6GHZ, IEEE Std 802.11ac-2013 (Dec. 11, 2013).
IEEE Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Television White Spaces (TVWS) Operation, IEEE 802.11af-2013 (Dec. 11, 2013).
IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).
IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 2: Sub 1 GHz License Exempt Operation, IEEE 802.11ah-2016 (Dec. 7, 2016).
Sony, "Consideration on RAN2 impacts of NTN support in NR," 3GPP TSG RAN WG2 Meeting #103bis, R2- 1814740, Chengdu, China (Oct. 8-12, 2018).
Third Generation Partnership Project, "Technical Specification Group Radio Access Network; NR; Medium Access Control (MAC) protocol specification (Release 15)," 3GPP TS 38.321 V15.4.0 (Dec. 2018).
Third Generation Partnership Project, "Technical Specification Group Radio Access Network; NR; Medium Access Control (MAC) protocol specification (Release 15)," 3GPP TS 38.321 V15.8.0 (Dec. 2019).
Third Generation Partnership Project, "Technical Specification Group Radio Access Network; Study on New Radio (NR) to support non terrestrial networks (Release 15)," 3GPP TR 38.811 V15.0.0 (Jun. 2018).
Third Generation Partnership Project, "Technical Specification Group Radio Access Network; Study on New Radio (NR) to support non terrestrial networks (Release 15)," 3GPP TR 38.811 V15.2.0 (Sep. 2019).
Third Generation Partnership Project, "Technical Specification Group Radio Access Network NR Radio Resource Control (RRC) protocol specification (Release 15)," 3GPP TS 38.331 V15.4.0 (Dec. 2018).
Third Generation Partnership Project, "Technical Specification Group Radio Access Network NR Radio Resource Control (RRC) protocol specification (Release 15)," 3GPP TS 38.331 V15.8.0 (Dec. 2019).
Ericsson, "Mobility aspects for NTN NR," 3GPP TSG-RAN WG2 #103bis, Tdoc R2-1814933, Chengdu, China (Oct. 8-12, 2018).

\* cited by examiner

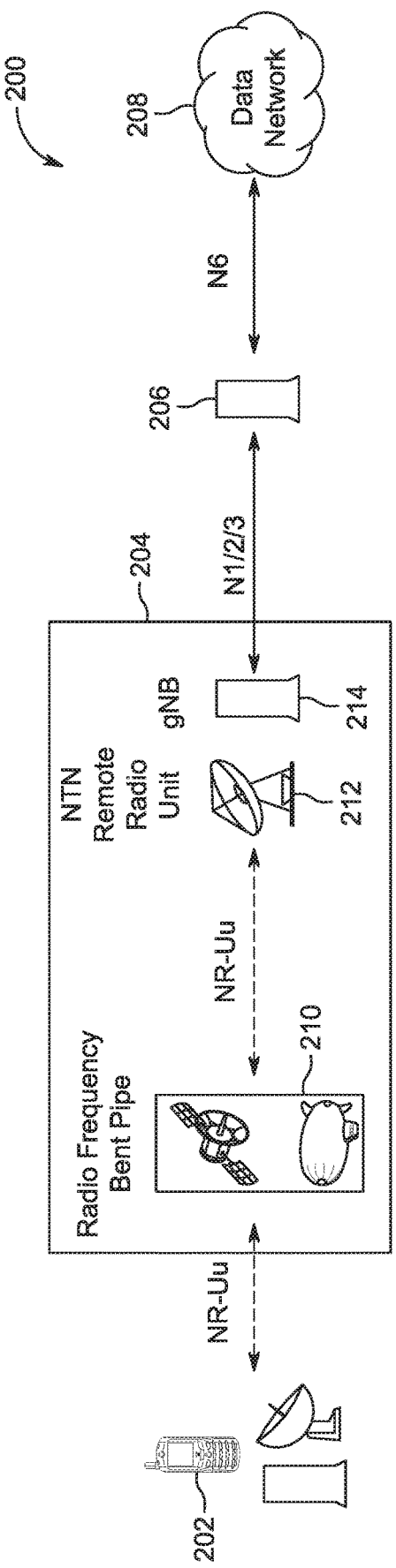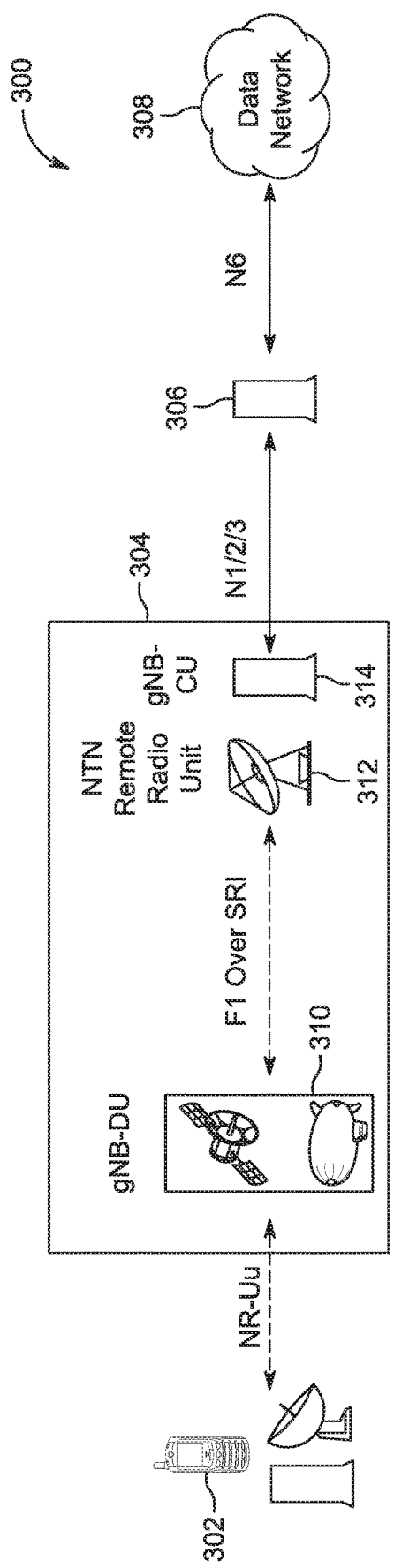

METHODS FOR RADIO RESOURCE MANAGEMENT IN MOVING NETWORKS

CROSS-REFERENCE TO RELATED APPLICATIONS

This application is the U.S. National Stage, under 35 U.S.C. § 371, of International Application No. PCT/US2020/017033, filed Feb. 6, 2020, which claims the benefit of U.S. Provisional Application No. 62/802,087, filed on Feb. 6, 2019, the contents of which are incorporated herein by reference.

BACKGROUND

Next generation air interfaces, including a further evolution of LTE Advanced Pro and New Radio (NR), support a wide range of use cases with varying service requirements. Service requirements may include, for example, low overhead low data rate power efficient services for massive machine type communications (mMTC), ultra-reliable low latency (URLLC) services and high data rate mobile broadband (eMBB) services. WTRU capabilities may be diverse and may include low power low bandwidth WTRUs, WTRUs capable of a very wide bandwidth (e.g., 80 Mhz), WTRUs that support high frequencies (e.g., over 6 Ghz), under various mobility scenarios (e.g., stationary, fixed, high speed trains) using an architecture that is flexible enough to adapt to diverse deployment scenarios. Deployment scenarios may include, but are not limited to include, stand-alone, non-standalone with assistance from a different air interface, centralized, virtualized, and/or distributed over ideal/non-ideal backhaul. Beamforming may be used to compensate for increased pathloss at higher frequencies (e.g. over 6 GHz). A large number of antenna elements may be used to achieve a higher beamforming gain. Analog and/or hybrid beamforming may be used to reduce an implementation cost, for example, by reducing a number of RF chains. In an example, analog/hybrid beams may be multiplexed in time. A beam sweep may refer to transmission/reception of beamformed channels multiplexed in time and/or frequency and/or space.

SUMMARY

A wireless transmit/receive unit (WTRU) may communicate in a non-terrestrial network (NTN) comprising a plurality of satellites. The WTRU may be preconfigured with a plurality of measurement configurations and a corresponding plurality of activation/deactivation criteria associated with the plurality of satellites. The activation/deactivation criteria includes at least activation timing information. The WTRU may activate and deactivate each of the plurality of measurement configurations over time in accordance with the activation/deactivation criteria. The WTRU may perform measurements on cell beams for satellites with active measurement configurations and report results based on the measurements to NTN.

BRIEF DESCRIPTION OF THE DRAWINGS

A more detailed understanding may be had from the following description, given by way of example in conjunction with the accompanying drawings, wherein like reference numerals in the figures indicate like elements, and wherein:

FIG. 2 shows a block diagram of an example split next generation (NG) RAN architecture in a non-terrestrial network (NTN) radio access network 204 with a bent pipe payload;

FIG. 3 shows a block diagram of another example split NG RAN architecture in a NTN radio access network with a gNB distributed unit (gNB-DU) processed payload;

DETAILED DESCRIPTION

Figure 1A:
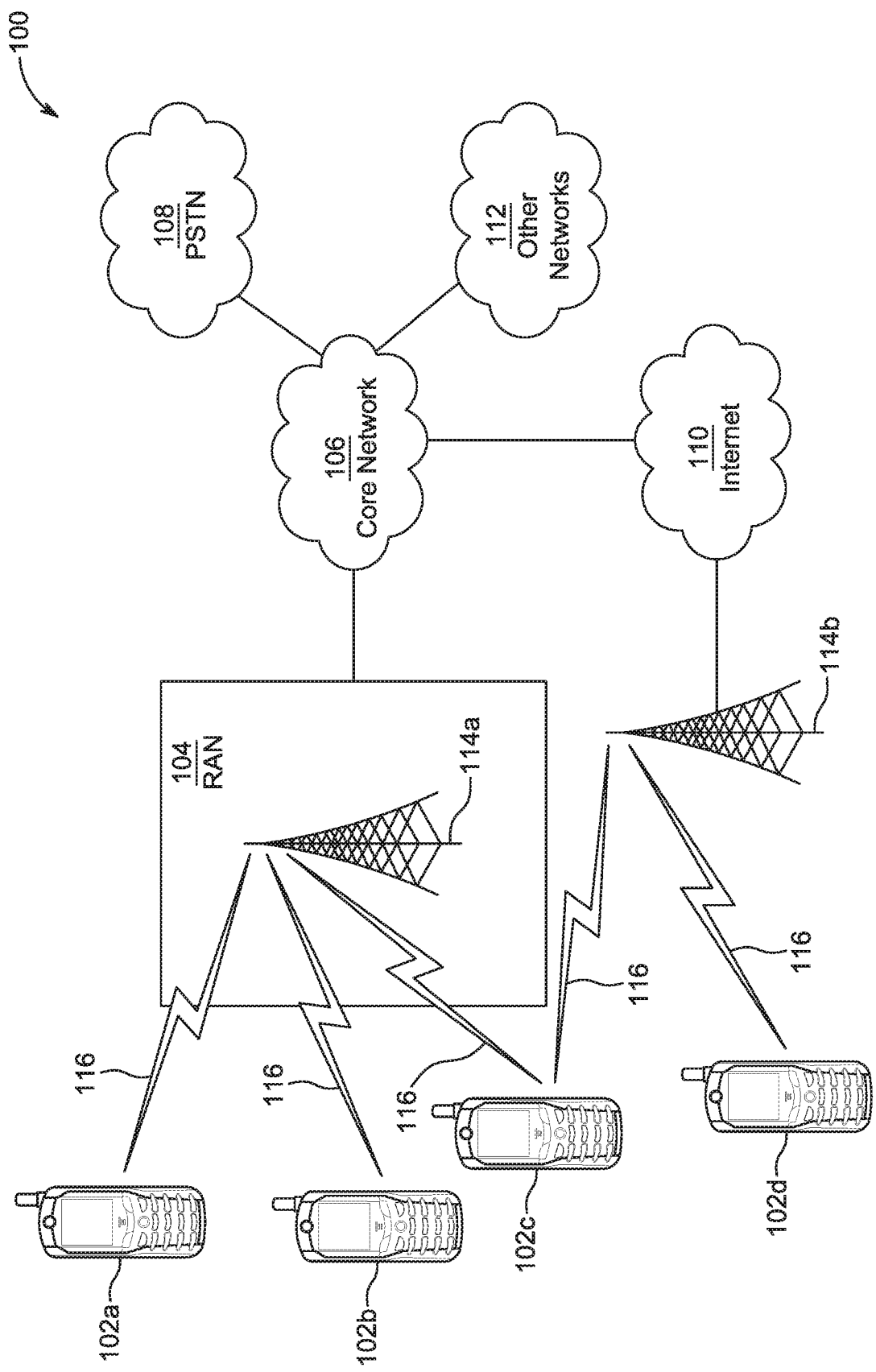
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word discrete Fourier transform Spread OFDM (ZT-UW-DFT-S-OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a radio access network (RAN) 104, a core network (CN) 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a station (STA), may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a WTRU.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106, the Internet 110, and/or the other networks 112. By way of example, the base stations 114a, 114b may be a base transceiver station (BTS), a NodeB, an eNode B (eNB), a Home Node B, a Home eNode B, a next generation NodeB, such as a gNode B (gNB), a new radio (NR) NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, and the like. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed Uplink (UL) Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using NR.

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106.

The RAN 104 may be in communication with the CN 106, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing a NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
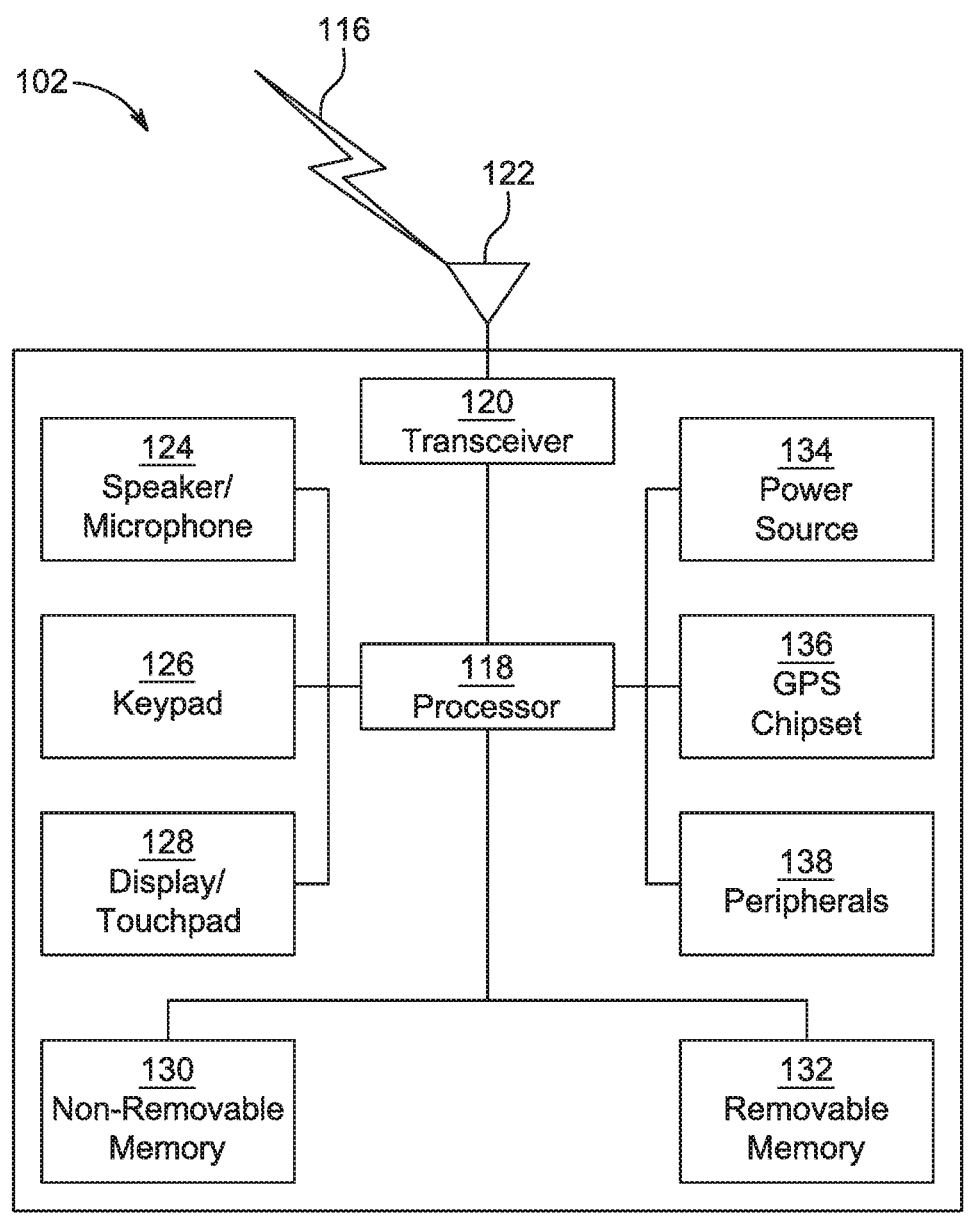
FIG. 1B is a system diagram illustrating an example wireless transmit/receive unit (WTRU) that may be used within the communications system illustrated in FIG. 1A according to an embodiment.
Figure 1C:
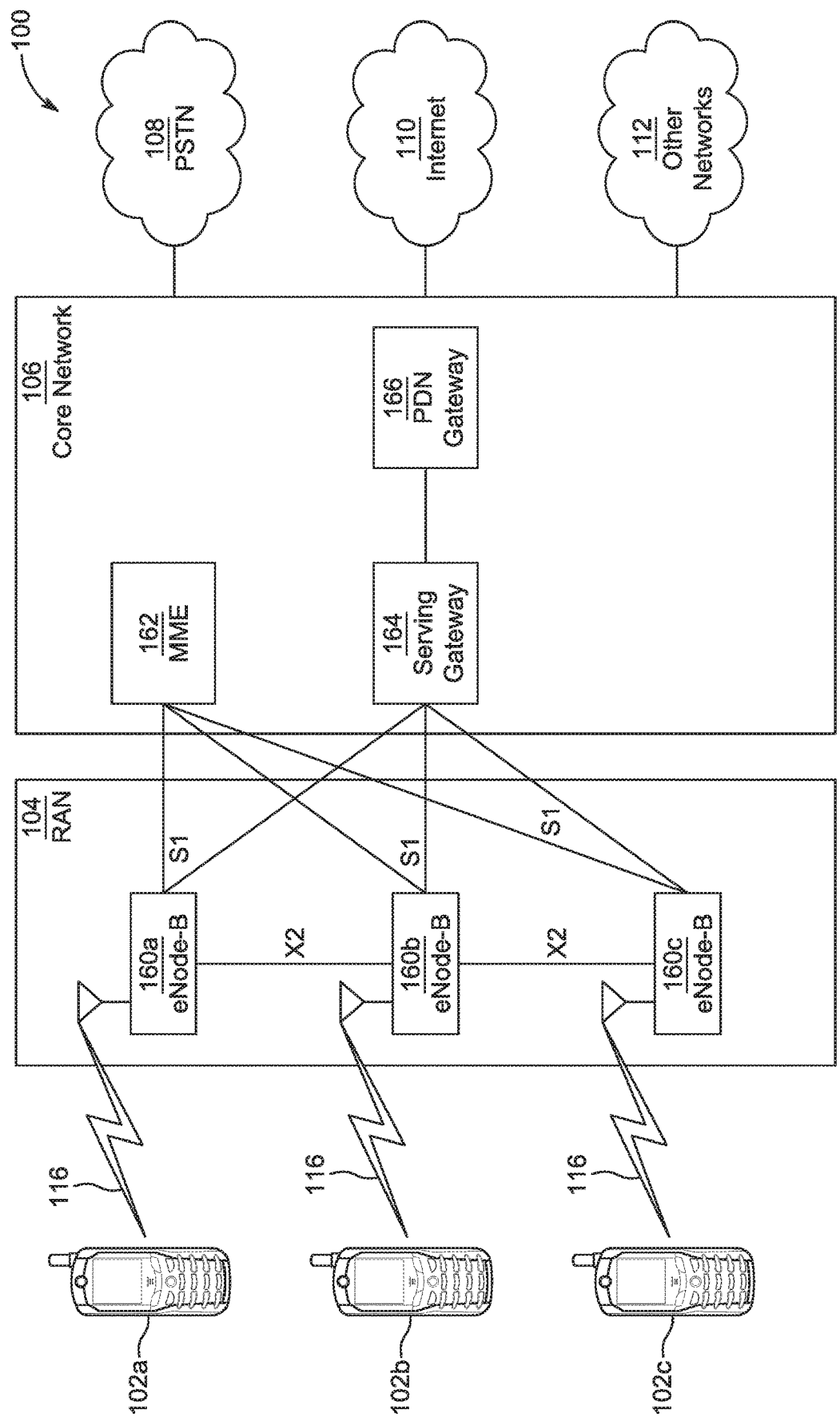
FIG. 1C is a system diagram illustrating an example radio access network (RAN) and an example core network (CN) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs), any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors. The sensors may be one or more of a gyroscope, an accelerometer, a hall effect sensor, a magnetometer, an orientation sensor, a proximity sensor, a temperature sensor, a time sensor; a geolocation sensor, an altimeter, a light sensor, a touch sensor, a magnetometer, a barometer, a gesture sensor, a biometric sensor, a humidity sensor and the like.

The WTRU 102 may include a full duplex radio for which transmission and reception of some or all of the signals (e.g., associated with particular subframes for both the UL (e.g., for transmission) and DL (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the DL (e.g., for reception)).

Figure 10:
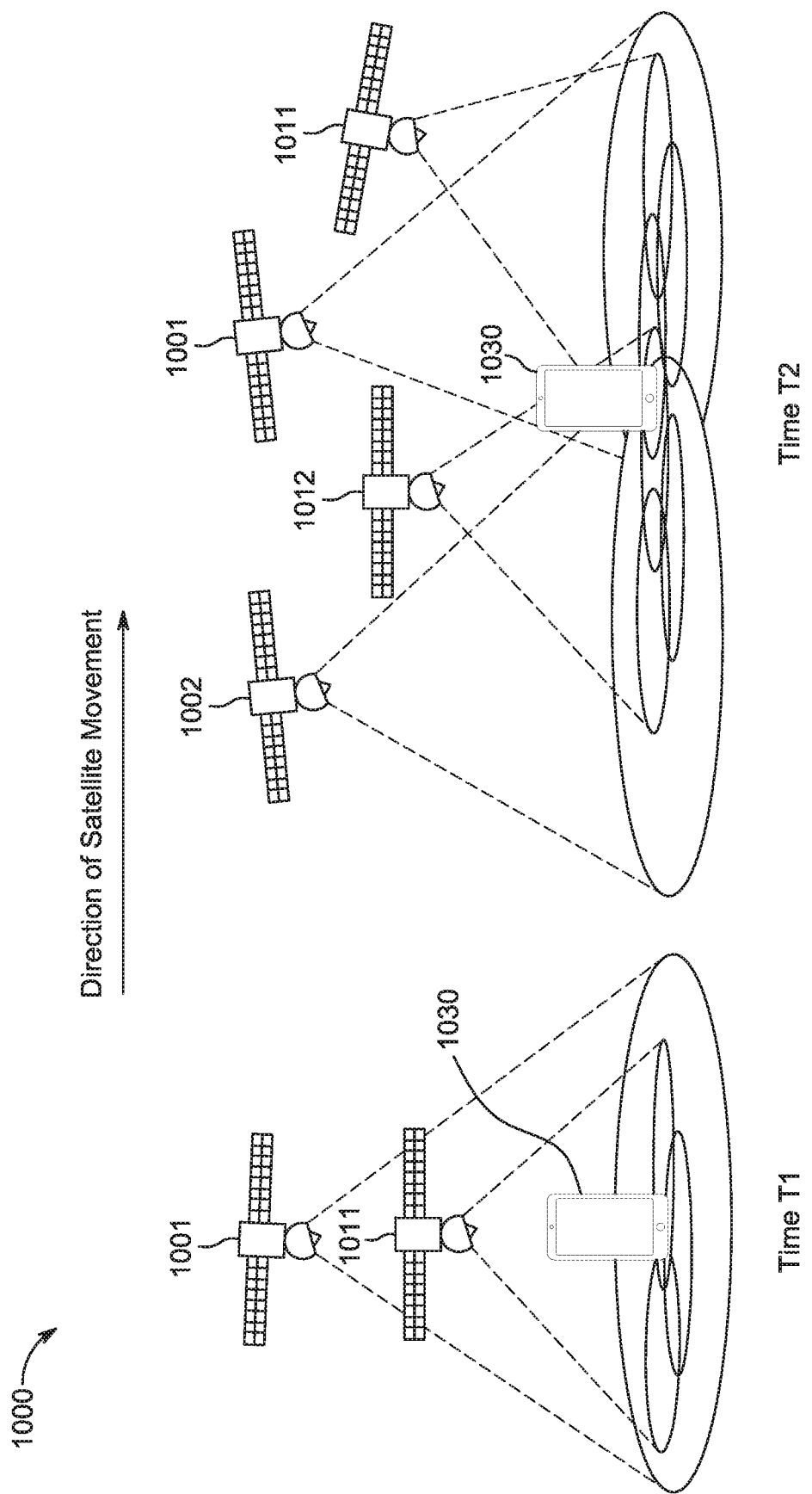
FIG. 10 shows an timing diagram of an example NTN including GEO satellites and LEO satellites providing network coverage via spot beams to a WTRU.

FIG. 10 is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 10, the eNode-Bs 160a, 160b, 160c may communicate with one another over an X2 interface.

The CN 106 shown in FIG. 10 may include a mobility management entity (MME) 162, a serving gateway (SGW) 164, and a packet data network (PDN) gateway (PGW) 166. While the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz, and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode) transmitting to the AP, all available frequency bands may be considered busy even though a majority of the available frequency bands remains idle.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
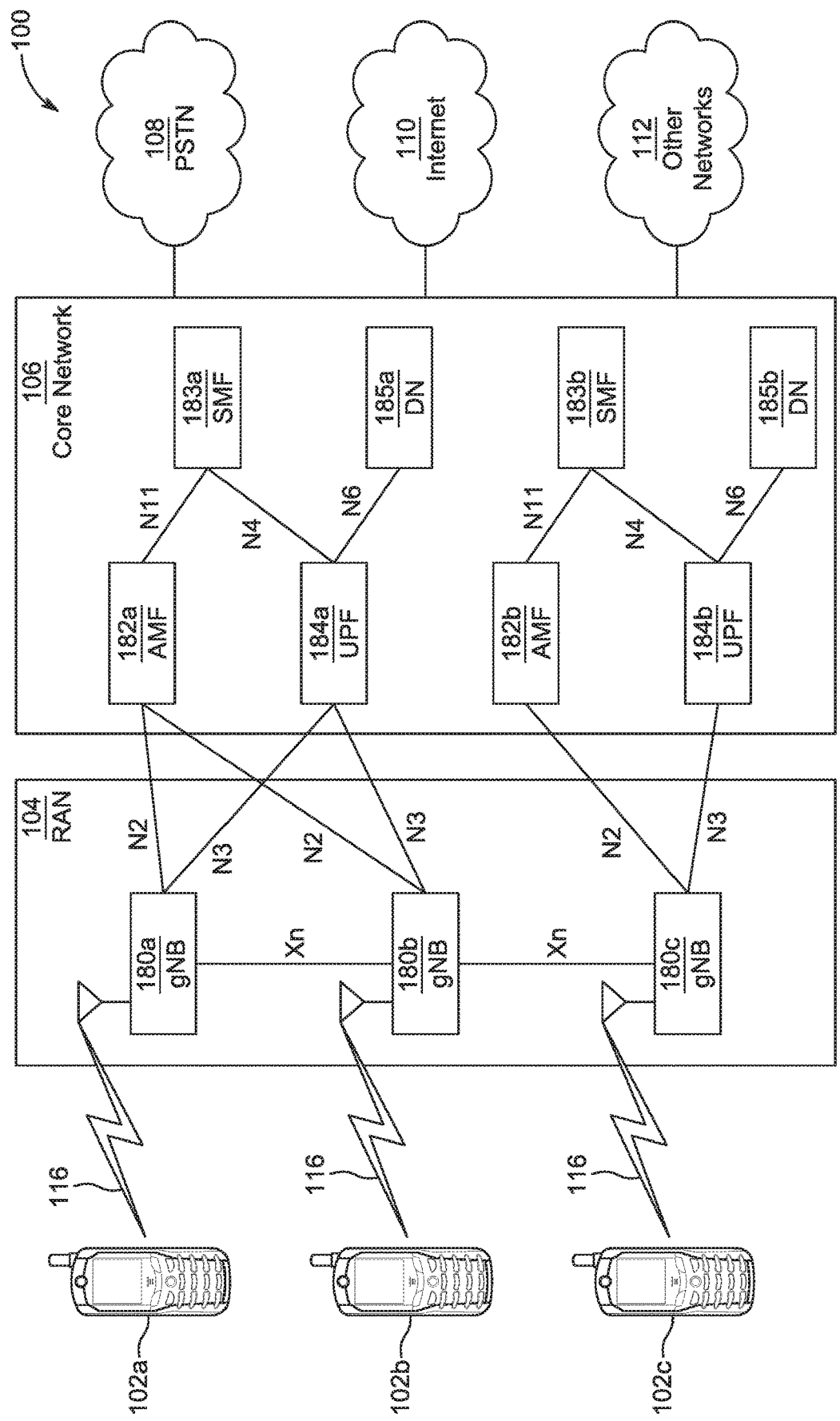
FIG. 1D is a system diagram illustrating a further example RAN and a further example CN that may be used within the communications system illustrated in FIG. 1A according to an embodiment.

FIG. 1D is a system diagram illustrating the RAN 104 and the CN 106 according to an embodiment. As noted above, the RAN 104 may employ an NR radio technology to communicate with the WTRUs 102a, 102b, 102c over the air interface 116. The RAN 104 may also be in communication with the CN 106.

The RAN 104 may include gNBs 180a, 180b, 180c, though it will be appreciated that the RAN 104 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing a varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, DC, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 106 shown in FIG. 1D may include at least one AMF 182a, 182b, at least one UPF 184a,184b, at least one Session Management Function (SMF) 183a, 183b, and possibly a Data Network (DN) 185a, 185b. While the foregoing elements are depicted as part of the CN 106, it will be appreciated that any of these elements may be owned and/or operated by an entity other than the CN operator.

The AMF 182a, 182b may be connected to one or more of the gNBs 180a, 180b, 180c in the RAN 104 via an N2 interface and may serve as a control node. For example, the AMF 182a, 182b may be responsible for authenticating users of the WTRUs 102a, 102b, 102c, support for network slicing (e.g., handling of different protocol data unit (PDU) sessions with different requirements), selecting a particular SMF 183a, 183b, management of the registration area, termination of non-access stratum (NAS) signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for MTC access, and the like. The AMF 182a, 182b may provide a control plane function for switching between the RAN 104 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 106 via an N11 interface. The SMF 183a, 183b may also be connected to a UPF 184a, 184b in the CN 106 via an N4 interface. The SMF 183a, 183b may select and control the UPF 184a, 184b and configure the routing of traffic through the UPF 184a, 184b. The SMF 183a, 183b may perform other functions, such as managing and allocating WTRU IP address, managing PDU sessions, controlling policy enforcement and QoS, providing DL data notifications, and the like. A PDU session type may be IP-based, non-IP based, Ethernet-based, and the like.

The UPF 184a, 184b may be connected to one or more of the gNBs 180a, 180b, 180c in the RAN 104 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering DL packets, providing mobility anchoring, and the like.

The CN 106 may facilitate communications with other networks. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local DN 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

The following description is for exemplary purposes and does not intent to limit in any way the applicability of the methods described further herein to other wireless technologies and/or to wireless technology using different principles, when applicable.

As used herein, a reference signal (RS) may refer to any signal, preamble or system signature that may be received and/or transmitted by a WTRU for one or more of the purpose(s). For example, various reference signals may be defined for beam management in the DL and UL. For example, downlink beam management may use a channel state information reference signal (CSI-RS), a demodulation reference signal (DMRS), a synchronization signal or other signal. In another example, uplink beam management may use a sounding reference signal (SRS), a DMRS, a random access channel (RACH) or other signal. In some cases, a network may refer to one or more gNBs (base station), that may be associated with one or more Transmission/Reception Points (TRPs), or may refer to any other node in a radio access network.

Non-Terrestrial Networks (NTNs), which employ airborne or space-borne vehicles such as satellites for communication, may foster a roll out of 5G services in unserved areas (e.g., isolated remote areas, rural areas, vessels in oceans) that may not be covered by terrestrial 5G networks. In some cases, NTNs may be used to upgrade the performance of terrestrial networks in underserved areas in a cost efficient manner. NTNs may be used to reinforce 5G service reliability, ensure service availability and provide scalability for 5G deployments. Different types of architectures may be envisioned based on a RAN functional split between a ground unit (terrestrial-based network) and satellite (NTN).

FIG. 2 shows a block diagram of an example split next generation (NG) RAN architecture 200 in a NTN radio access network 204 with a bent pipe payload. A WTRU 202 that is too remote to connect terrestrially to the data network 208 may access the data network 208 via the NTN RAN 204, which includes an airborne or space borne station 210 (e.g., satellite) that communicates with a NTN remote radio unit 212. The non-terrestrial station 210 relays information between the WTRU 202 and the NTN remote radio unit 212 (e.g., over an NR-Uu air interface) using a bent pipe principle by processing signals for retransmission by changing only amplification and/or radio frequency shift. The terrestrially located NTN remote radio unit 212 communicates with the gNB 214 (e.g., co-located) to access the data network 208 via a core network (CN) 206.

FIG. 3 shows a block diagram of another example split NG RAN architecture 300 in a NTN radio access network 304 with a gNB distributed unit (gNB-DU) 310 processed payload. The WTRU 302 accesses the data network 308 via the NTN RAN 304, which includes an airborne or space borne gNB-DU 310, and terrestrially located gNB-CU 314. In an example, the gNB-DU 310 hosts the radio link control (RLC), medium access control (MAC) and physical (PHY) layer protocol interactions with the WTRU 302. The gNB-CU 314 hosts the radio resource control (RRC), service data adaptation protocol (SDAP) and packet data convergence protocol (PDCP) layer protocol interactions with the WTRU 302. The gNB-CU 314 may control one or more gNB-DUs 310 via F1 signaling, which is transported over a satellite radio interface (SRI) with the NTN remote radio unit 312. The terrestrially located NTN remote radio unit 312 communicates with the gNB-CU 314 (e.g., co-located) to access the data network 308 via a core network (CN) 306.

Figure 4:
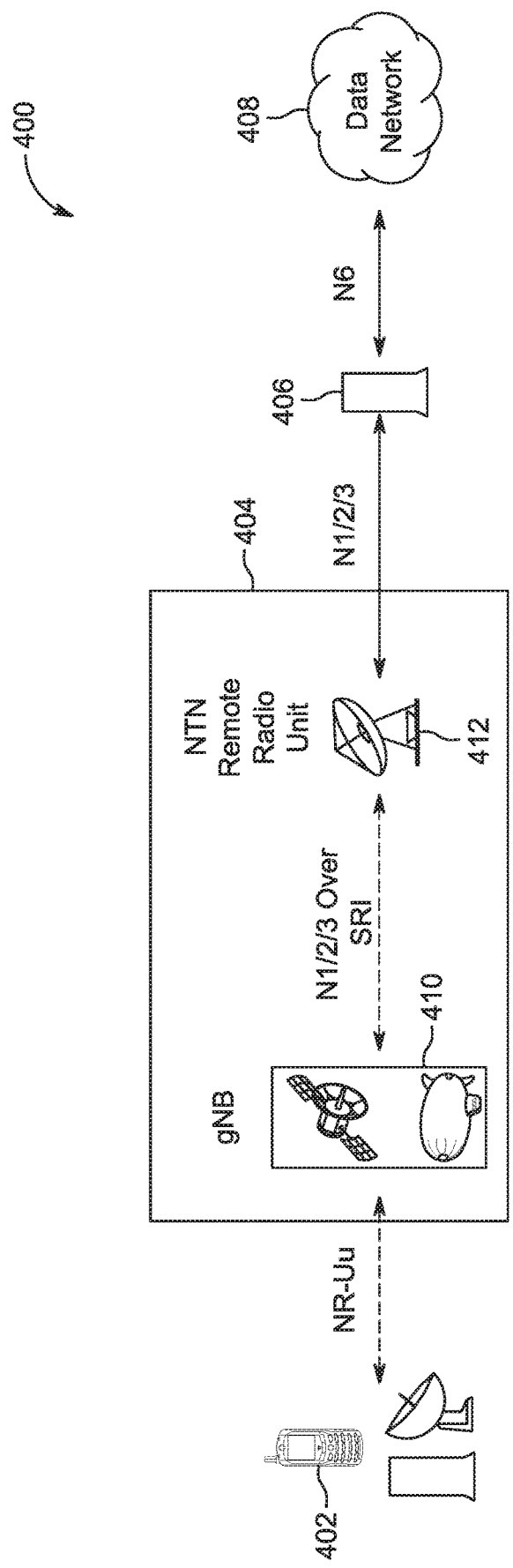
FIG. 4 shows a block diagram of another example split NG RAN architecture 400 in a NTN radio access network with a gNB processed payload.

FIG. 4 shows a block diagram of another example split NG RAN architecture 400 in a NTN radio access network 404 with a gNB 410 processed payload. The WTRU 402 accesses the data network 408 via the NTN RAN 404, which includes an airborne or space borne gNB 410 that communicates over a SRI with the NTN remote radio unit 412. The terrestrially located NTN remote radio unit 412 relays the communication from the space borne gNB 410 to the data network 408 via a terrestrially located core network (CN) 406.

In the example procedures and systems described herein, a message transmitted by the network to a WTRU may originate from a non-terrestrial network node (e.g., a satellite) or a terrestrial node (e.g., a gNB, eNB, base station) depending on the network configuration. For example, an RRC configuration message originates from the RRC layer, so the network node that sends and receives RRC messages depends on where that RRC layer is located in the network. In the example configurations shown in FIGS. 2 and 3, the RRC layer is located terrestrially so an RRC activation command may be sent by a terrestrial network node. In the example configuration shown in FIG. 4, the RRC layer is located in the satellite so RRC messages would originate from the satellite. In another example, a MAC control element (CE) may be transmitted by a terrestrial node in the configuration of FIG. 2, and transmitted by a satellite in the configurations of FIGS. 3 and 4. Thus, in the example procedures described herein, a message received from the network (a network node) may refer generally to a non-terrestrial network node or a terrestrial node, and is determined by the network configuration.

A satellite may generate several beams (referred to as beams, spot beams or beam spots) to cover the satellite's service area bounded by the satellite's field of view or footprint. A NTN cell may be comprised of one or multiple spot beams, and each satellite in the NTN may have multiple cells. The mapping of spot beams to cells depends on the network implementation. Different configuration for the spot beams are possible based on the relationship between spot beams, synchronization signal blocks (SSBs), and physical cell identifiers (PCIs). The following example configurations may be used for spot beams: multiple PCIs may be used per satellite, such that each spot beam may correspond to an SSB/PCI pair; multiple PCIs may be used per satellite, such that each spot beam may correspond to a PCI; and/or a single PCI may be used per satellite, such that each spot beam may correspond to an SSB.

Figure 5:
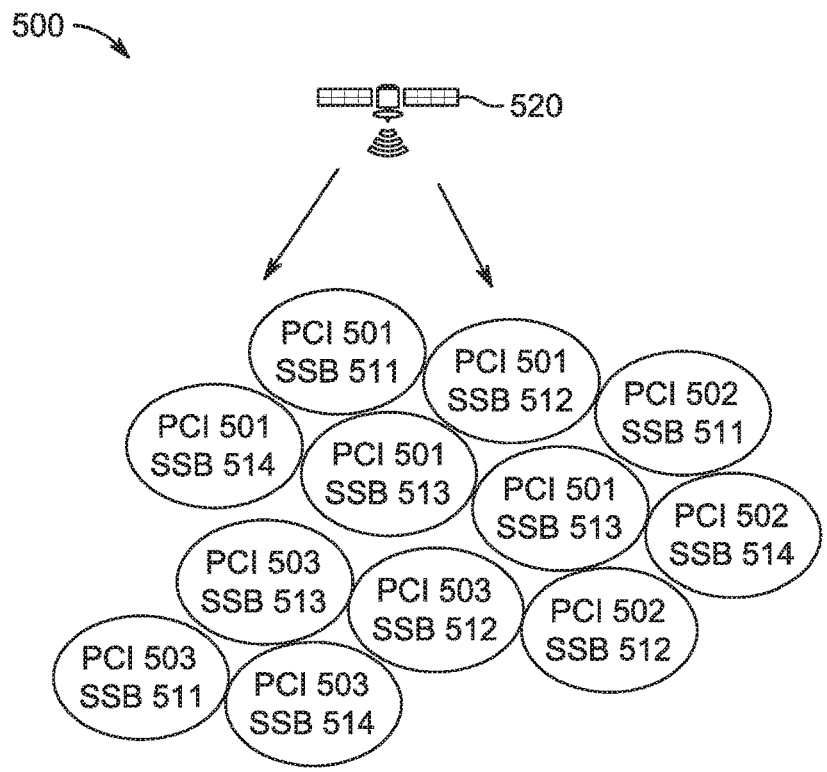
FIG. 5 shows an example spot beam configuration including multiple physical cell identifiers (PCIs) per satellite.
Figure 6:
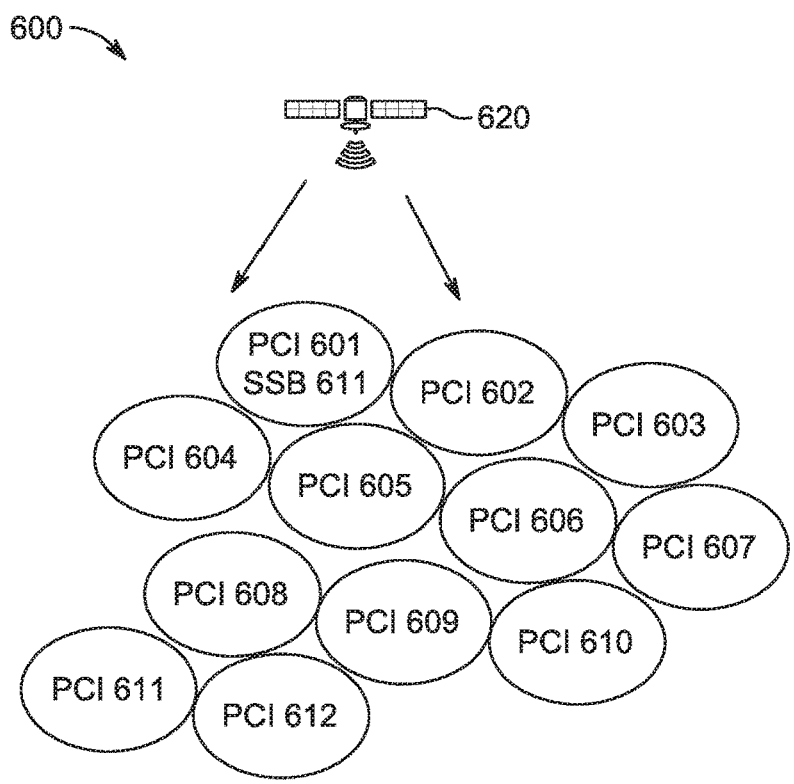
FIG. 6 shows an example spot beam configuration including multiple PCIs per satellite, where each spot beam corresponds to a PCI.
Figure 7:
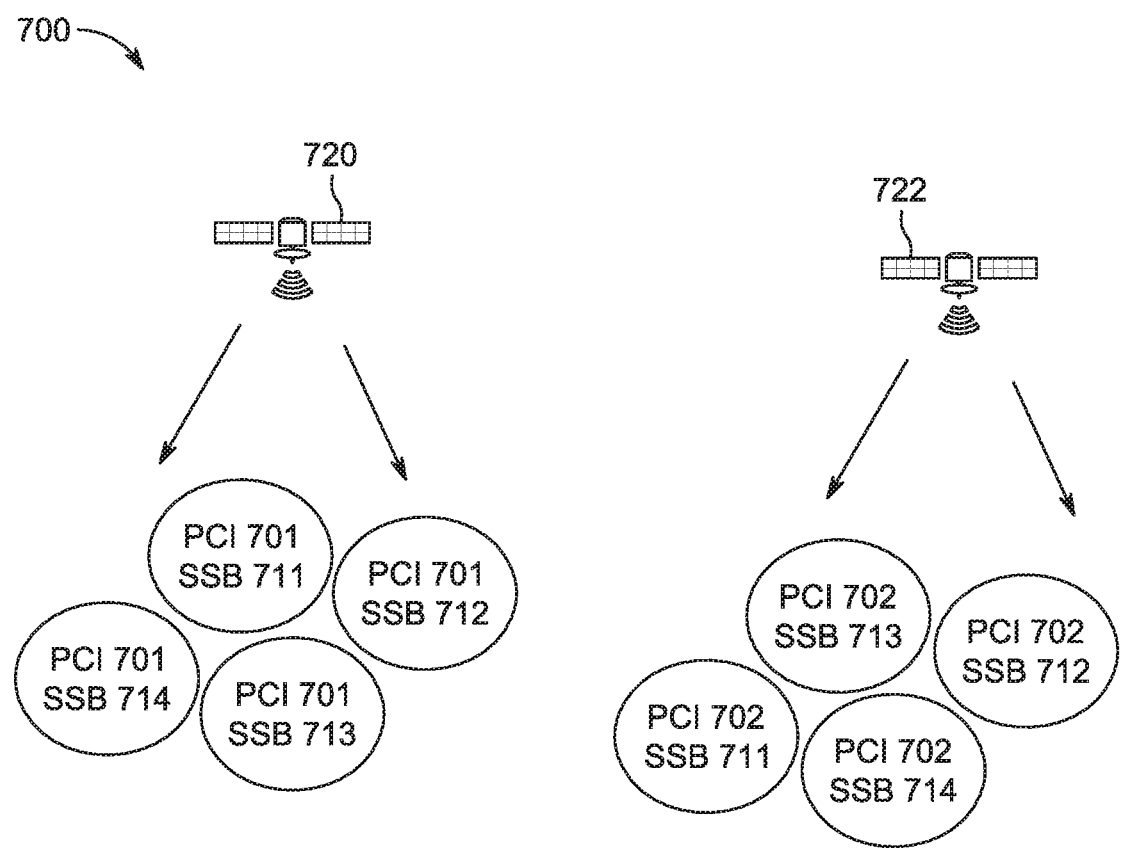
FIG. 7 shows an example spot beam configuration 700 including a single PCI per satellite, where each spot beam corresponds to a synchronization signal block (SSB)

FIG. 5 shows an example spot beam configuration 500 including multiple PCIs per satellite 520. According to the example spot beam configuration 500, each spot beam corresponds to an PCI/SSB pair a shown (e.g., PCI 501/SSB 511, PCI 501/SSB 512, PCI 502/SSB 511 . . . PCI 503/SSB 514). FIG. 6 shows an example spot beam configuration 600 including multiple PCIs per satellite 620, where each spot beam corresponds to a PCI as shown (e.g., PCI 601, PCI 602 . . . PCI 612). FIG. 7 shows an example spot beam configuration 700 including a single PCI 701/702 per satellite 720/722, respectively, where each spot beam corresponds to an SSB as shown (e.g., SSB 711, SSB 712, SSB 713, SSB 714).

In the examples described herein, a measurement object may include a time/frequency resource on which the WTRU performs a measurement. A measurement configuration may include a list of one or more measurement objects, and may further include any of the following information: reporting criteria, measurement identities linking objects to reporting configuration, measurement filtering configuration, and/or time periods during which the WTRU may perform measurements. In the examples described herein, procedures for measurement objects may similarly apply to measurement configurations and vice versa.

As part of measurement configuration, the network may configure an RRC_CONNECTED WTRU to perform and report measurements according to a measurement configuration. The measurement configuration may be provided by the network to the WTRU using dedicated signaling, such as an RRCReconfiguration message. The measurement configuration may include in one or more of the following example parameters. An example parameter may include a list of measurement objects on which the WTRU shall perform measurements. In an example, one or multiple reporting configurations may be used per measurement object. Another example parameter may include a list of reporting configurations, which may include a reporting criterion that triggers the WTRU to send a measurement report, an RS type used for measurements (e.g., CSI-RS SS/PBCH block), and/or the reporting format. Another example parameter may include the measurement identities, linking one measurement object with a reporting configuration. Another example parameter may include the quantity configuration that defines the measurement filtering configuration used for all event evaluation and related reporting. Another example parameter may include the measurement gap, which may include the periods of time during which the WTRU may perform measurements.

Measurement configuration signaling and procedures may enable a WTRU in RRC_CONNECTED state to maintain a measurement object list, reporting configuration list, and/or a measurement identities list. For NR measurement objects, the WTRU may measure and report on serving cells (e.g., a primary cell (SpCell) and/or one or more secondary cells (Scells)), cells listed within the measurement objects, and/or cells not listed within the measurement object(s) that have been detected by the WTRU on one or more SSB frequencies and one or more subcarrier spacing(s) indicated by the measurement object(s). A WTRU in RRC_CONNECTED may derive cell measurements by measuring one or multiple beams associated per cell as configured by the network. For all cell measurement results, the WTRU may apply filtering (e.g., layer 3 (L3) filtering) before using measured results for evaluation of reporting criteria and measurement reporting.

Deployments with moving network nodes, such as satellites or other airborne/space-borne nodes, introduce additional complications to resource measurements and configurations compared to networks with physically fixed network nodes (e.g., fixed eNB/gNBs), at least in part because the locations of the cells change over time due the movement of the network nodes. In these deployment scenarios, a measurement configuration may not stay valid over time, and may become more complex with the additional movement of the WTRU.

There may be many different satellite orbital classes, each with a different orientation, velocity and distance relative to the WTRU. For example, measurement objects for slow moving satellites, such as geostationary (GEO) satellites (e.g., at altitudes around 35,000 km), may remain valid for a long time. Satellites classified as low earth orbiting (LEO) satellites (e.g., at altitudes ranging from 600 km to 1500 km) may travel at speeds on the order of 7.5 km/s. In this case, for a spot beam footprint diameter of approximated 100 km, the spot-beam may serve any particular location for approximately 2 minutes. WTRUs connected to the LEO satellite, with motion ranging from stationary to speeds as high as 1000 km/hr, may have measurement configurations that become invalid quickly resulting in a need for continuous or frequent measurement report reconfigurations. Using LEO satellites, the network may also need to continuously compensate the measurement objects for differences in propagation delay and frequency shift. Additionally, there may be significant propagation delays associated with NTNs, for example on the order of 250 ms one-way for geostationary satellites. Given such large delays, it may be difficult to assess the accuracy of the measurements, especially for finer measurements such as tracking rapid variations in channel conditions.

Figure 8:
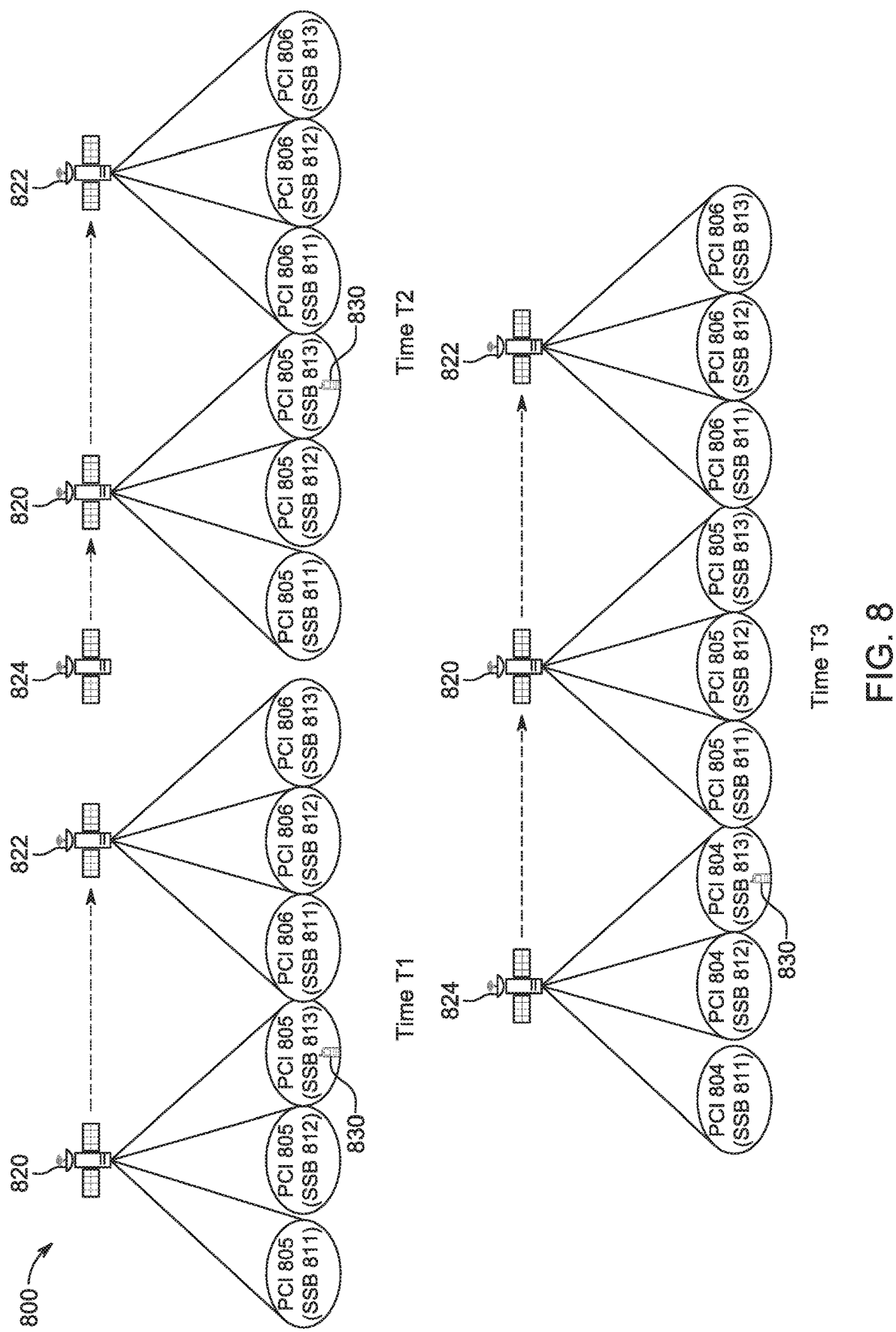
FIG. 8 shows a timing diagram of an example NTN including discrete motion of the serving beams and satellites serving a WTRU.

FIG. 8 shows a timing diagram of an example NTN 800 including discrete motion of the serving beams and satellites 820, 822, 824 serving a WTRU 830. The WTRU 830 is assumed to be relatively stationary from time T1 to T2 to T3 (e.g., not changing location or moving very slowly compared to speed of satellites and time scale). At Time T1, the WTRU may be served and receive measurement configurations from the spot beam with PCI 805/SSB 813 from satellite 820. The network 800 may compensate for its movement by adapting antenna and/or beam directions to maintain the coverage of a given footprint for WTRU 830 from T1 to T2. However, a breaking point is reached at time T3 where the WTRU 830 is covered by a different beam with PCI 804/SSB 813 handled by a different satellite 824 (or similarly different beam of the same satellite 820). In this case, the PCI changes from PCI 805 to PCI 804 from time T2 to time T3. In the example NTN 800, the footprint of a satellite 820, 822, 824 may be associated with something other than the identity of the serving beam/satellite (or for a given time window) enabling the distinction of mobility due to motion of the WTRU versus mobility due to satellite motion.

Figure 9:
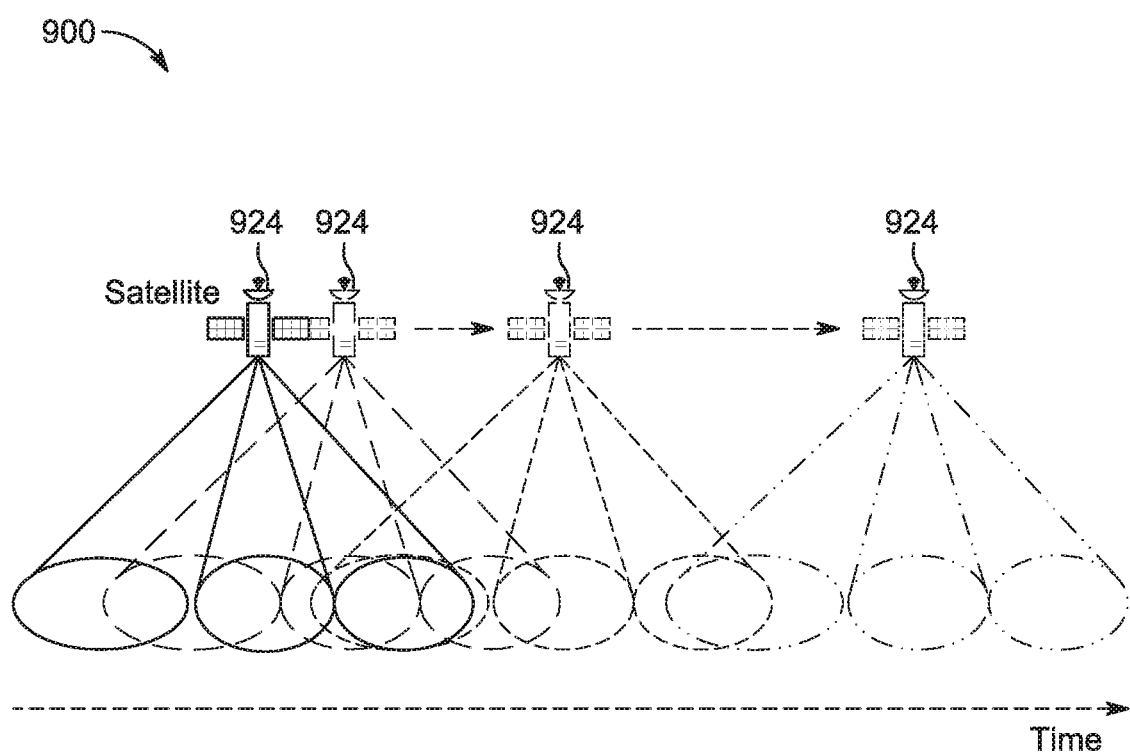
FIG. 9 shows a timing diagram of an example NTN including continuous motion over time of the serving beams and satellite.

FIG. 9 shows a timing diagram of an example NTN 900 including continuous motion over time of the serving beams and satellite 924. In this case, the footprint on earth is not static but moves with the direction of the satellite 924 over time. In this scenario, the PCI and/or SSB may be linked to the satellite 924 beam and thus moves on the surface of earth continuously.

A difference between the example in FIG. 8 and the example in FIG. 9 is that the relative location of a static WTRU within a serving beam is constant in the example in FIG. 8, while the relative location of a static WTRU within a serving beam changes over time in FIG. 9. Thus, in the example of FIG. 8, the WTRU 830 located in the cell center of the satellite/beam at time T1 is still at the cell center of the satellite beam at time T2 (for a slow moving satellite). In the example of FIG. 9, a static WTRU that is in the cell center of a cell at a first time may be at the edge of the same cell at a second later time.

Methods for radio resource management and measurement configuration are disclosed herein to manage the accuracy and duration of the validity of network configurations in order to address the complications caused by significant propagation delays and the high-speed of the network nodes in non-terrestrial moving networks. The methods disclosed herein may be used with any type of moving networks (e.g., NTNs, high-altitude platforms (HAPs), drones, mobile integrated access and backhaul (IAB) networks) and with any type of moving nodes (e.g., satellites, airborne vehicles, space-borne vehicles, terrestrial vehicles). Moving networks may include networks with any moving node, including moving WTRUs and/or moving network nodes. In some cases, the moving nodes have a predictable path of movement (e.g., the ephemeris of a satellite in orbit).

In an example, a method for managing measurement configuration in moving networks (e.g., NTNs) may be a function of the time instance and/or the WTRU's location. In an example, a WTRU may be configured to report the measurement results of the neighboring beam spots and/or cells and serving beam spots/cells. The WTRU may be preconfigured with a set of measurement configurations that are conditionally added or removed to or from the measurement configuration, or activated or deactivated, based on the location of the WTRU and/or the time. The activation/deactivation may be initiated autonomously by the WTRU when it enters a zone of interest and/or signaled by the network (e.g., a satellite node or a terrestrial node, depending on the network configuration) dynamically and/or semi-statically (e.g., using DCI, broadcast message such as a master information block (MIB) or a system information block (SIB), RRC messages, or a MAC control element (CE)). The WTRU may receive a set of measurement objects or measurement configurations linked to a specific beam spot and corresponding to the footprint of a satellite or a specific geographical area comprising multiple beam spots/satellite coverage areas. A footprint may correspond to one or more SSBs, PCIs, or combinations of SSB/PCI in a given time instance.

In an example, a WTRU may perform autonomous activation/deactivation or selection of a measurement configuration or object. For example, the WTRU may autonomously activate the measurement configuration of interest associated with the current time instance when it enters the given area. The footprint or beam spot may for example have a dedicated identity. When a cell is covering a given footprint of interest it may be associated to the footprint identity that it is covering. For example, a footprint identity (ID) may be broadcasted by the network (e.g., in a MIB or SIB) when the satellite and beam are covering the area, and/or in the serving cell configuration information element (IE) received from the network. In an example with reference to FIG. 8, the footprint served by PCI 805 at time T1 may have the same footprint identity as the footprint served by PCI 804 at time T3 because it is covering the an overlapping geographic area at a later time (the WTRU 830 is assumed to be relatively stationary from time T1 to T2 to T3).

In an example, to reduce the number of RRC reconfigurations received from the network (e.g., satellite or terrestrial node, depending on the network configuration), and to avoid long time delays for reception of the RRC reconfiguration messages, the WTRU may be preconfigured with an association between footprint IDs and measurement configurations, such that the footprint IDs may be associated with time instances and geographical locations. For example, the WTRU may receive an association information (e.g., in the form of an association table) when the WTRU enters in connected mode (RRC_CONNECTED) and/or when the WTRU receives an RRC re-configuration message. The WTRU may be configured with an association between location coordinates (e.g., latitude and longitude) and footprint IDs, which the WTRU may use to perform measurement configuration/object activation. The WTRU may assess its location independently, or may receive a message including an indication (e.g., in a DCI and/or MIB/SIB) of the identity of the footprint corresponding to the currently geographical location of the WTRU (at the current time).

In an example, the WTRU may be preconfigured with multiple measurement configuration (object) instances, each associated to a validity timer. The WTRU may de-activate and activate the measurement configurations (objects) of interest based on the validity timer. The WTRU may further be configured with conditions for applicability of the validity timer-based measurement configuration. For example, if the speed or location of the WTRU has changed by an offset, or when the WTRU has assessed that the serving and neighboring cells have moved considerably (e.g., based on satellite ephemeris information) while the measurement configuration has not been updated, the WTRU may interrupt the configured measurements to potentially activate a different measurement configuration.

When the WTRU moves from a first location (e.g., the area of validity for measurement configuration) to a second location and enters a new beam spot, the WTRU may use the measurement configuration associated with the new beam spot. The new network measurement configuration may be applied using any one or more of the following approaches: a new Measconfig may be reconfigured by the network to the WTRU; a set of measurement objects may be added/removed to a measurement object list in a measurement configuration of the WTRU; a set of measurement identities (IDs) may be added/removed to the list of measurement IDs that links a measurement object to the reporting configuration.

In an example, a network-assisted dynamic or semi-static configuration of measurements may be provided to by the network to a WTRU. A measurement configuration may be linked to a specific coverage area (e.g., a beam spot and/or a fingerprint ID) and a validity timer or time range. In an example, the network may be know the location of the WTRU and the network may signal to the WTRU to activate and/or add a measurement configuration in accordance with the WTRU's location. For example, the WTRU entering a zone (particular location or area) may trigger an RRC configuration by the network (knowing the location of the WTRU). If the WTRU assessed its new location but has not received an RRC reconfiguration, the WTRU may send a measurement configuration request. In another example, the measurement configuration may be broadcasted by the network, for example in a MIB or SIB. In an example, a received signal (e.g., a DMRS of PBCH or SSB) at the WTRU being above a threshold may trigger a measurement configuration update (e.g., the network broadcasting a measurement configuration update in a MIB or SIB). This approach may ensure that the WTRU is within the coverage of the beam spot corresponding to the current measurement configuration, even in the case that the network does not have current location information for the WTRU.

In an example, beam management may occur at the RRC level (RRC-based beam management). In an example, different beams of a satellite may be associated with different SSBs in the frequency domain (e.g., each beam has a different cell defining SSB (CD-SSB) with the same PCI, or a different PCI). In an example, each beam may be associated with a particular bandwidth part (BWP). The different BWPs associated with each beam may or may not be overlapping in frequency. In an example, each SSB may be associated to a different MIB that carries information about control resource set (CORESET) 0 and search space 0 confined in the frequency band associated with the beam spot for reception of SIB1.

When the WTRU moves in the coverage area of a satellite, the beam management may be handled at the L1 level. For example, the WTRU may report an L1 beam measurement from different CD-SSBs and may be configured with a serving beam based on the L1 beam measurement reports. When the WTRU changes its serving beam, an RRC reconfiguration may be transmitted from the network to the WTRU to update the servingcellconfig IE with a new serving CD-SSB. When the WTRU moves in the coverage of a satellite, the beam management may be handled by layer 3 (L3) RRC signaling. For example, the WTRU may report L3 measurements of different beams and may receive a handover command or an RRC message for reconfiguration of the serving cell.

In an example, a WTRU (in connected mode) may be configured to perform autonomous cell search and/or autonomous measurement reporting. The WTRU may perform a cell search while in connected mode if the WTRU has moved to a new coverage area and has not received a new measurement configuration. This may happen, for example, in the case of a serving satellite coverage area comprising multiple beam spots with a same PCI and with different SSBs in the frequency domain. If the beam management is handled at L1, the WTRU has not performed a handover and thus may not have received any new RRC configurations including new measurement configuration prior to being served by the new beam spot.

In an example, the WTRU may determine its new (current) location, and the WTRU may initiate a cell search and report the detected cells if any one or more of following conditions are satisfied. For example, under a per-configuration condition, the WTRU is indicated in a measurement configuration to perform a cell search in a set of frequency carriers for a measurement report when the serving beam spot changes. In another example condition, the measurement associated with the best cell or cells (e.g., n best listed cell) or listed beam spots is below a threshold indicating that none of the configured neighboring cells (listed cell list) is still in the coverage of the WTRU. In another example condition, the measurement result associated with the serving cell and/or serving beam spot is below a threshold. In another example condition, a timer starts when the WTRU has changed its serving beam and is stopped when the WTRU receives an RRC message for measurements configuration update. At timer expiry, the WTRU may start the cell search. In any of the above examples, the WTRU may be configured with a timer that starts when the WTRU initiates the connected mode cell search. When the timer expires the WTRU reports the measurements associated with all detected cells where the measurement is above a certain threshold.

As explained above, deployments with moving network nodes introduce complications to radio resource management, including measurement and configuration. Cell geographical location changes constantly, and although a WTRU may be served by a (relatively static) GEO satellite cell, neighbor cells' configurations may change continuously due to continuously moving LEO satellite cells (e.g., similarly, moving medium earth orbit (MEO) satellites and/ or moving HAPs). In an example, a WTRU may expect new cell configurations as frequently as every 7 s. FIG. 10 shows an timing diagram of an example NTN 1000, where GEO satellites 1001 and 1002 and LEO satellites 1011 and 1012 provide network coverage via spot beams to a WTRU 1030. The cells covering the WTRU 1030 change over time. In the example of FIG. 10, the WTRU 1030 is in the beam coverage of GEO satellite 1001 and LEO satellite 1011 at time T1, and at later time T2, as the satellites 1011, 1012 move (and possibly the WTRU 1030), the WTRU 1030 has different beam coverage (with possibly different beams) from GEO satellites 1001, 1002 and LEO satellites 1011, 1012. As the beam coverage for WTRU 1030 changes due to satellite movement, the measurement configurations need to be updated. Frequent RRC signaling for configuring mobility-related measurements, as used for networks with stationary cells (stationary network nodes), may not be suitable for moving networks because it requires large amounts of control signaling (e.g., RRC), which is costly to the satellite operator.

Figure 11:
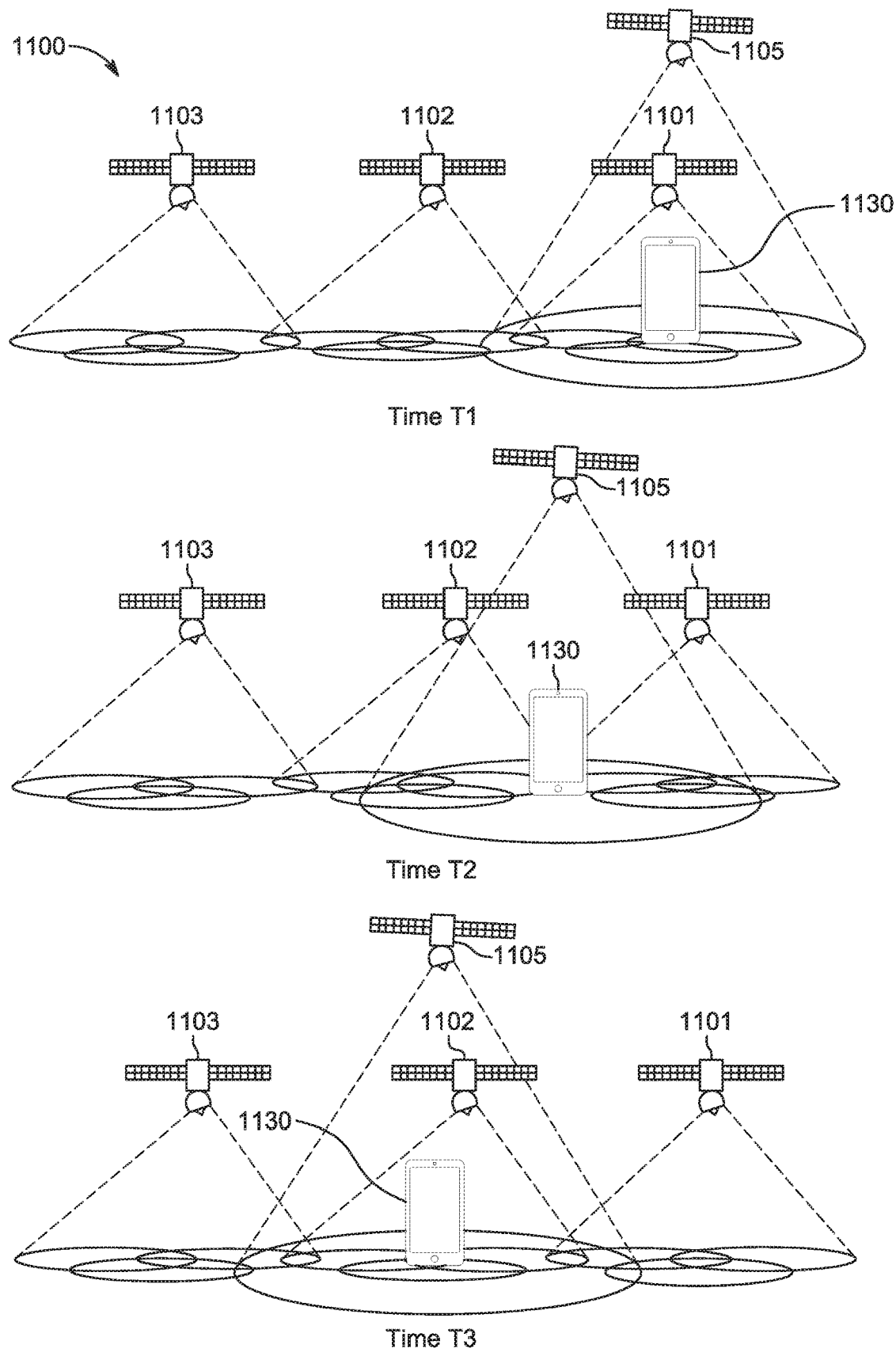
FIG. 11 shows another timing diagram of an example NTN including a GEO satellite and LEO satellites providing network coverage via spot beams to a WTRU.

FIG. 11 shows an timing diagram of another example NTN 1100, where GEO satellite 1105 and LEO satellites 1101, 1102 and 1103 provide network coverage via spot beams to a WTRU 1130. The low mobility WTRU 1130 is being served by a static GEO cell from GEO satellite 1104, however due to movement of the LEO cells associate with moving LEO satellites 1101, 1102, 1103, the neighboring cell set for the WTRU 1130 constantly changes in a deterministic manner because the movement of the LEO satellites 1101, 1102, 1103 is also deterministic as dictated by their orbital path. In accordance with an example measurement configuration update procedure, at time T1, The WTRU 1130 may receive (be preconfigured with) multiple measurement configurations and associated activation/deactivation criteria for multiple satellites, including current LEO satellites for which the WTRU 1130 is currently in the coverage area (e.g., LEO satellite 1101) and upcoming satellites for which the WTRU 1130 will be in the coverage area at a future time (e.g., LEO satellites 1102 and 1103). The measurement configurations may be provided to the WTRU 1130 by the GEO satellite 1105 and/or a current LEO satellite 1101. The upcoming satellites are known because the trajectory of the LEO satellites 1101, 1102, 1103 over time are known (the satellites have predictable path of movement), and the relative location of the WTRU 1130 may be treated as fixed (at least over a longer period of time). Table 1 shows example measurement configurations for the current and upcoming satellites and the corresponding activation/deactivation criteria for the WTRU 1130 at its current geographical location. The activation/deactivation criteria includes the applicable time (e.g., discrete time instances and/or time ranges) and is used by the WTRU 1130 to determine when to activate/deactivate the corresponding measurement configurations.

TABLE 1 measurement configurations for WTRU 1130 at a first location for LEO satellites and corresponding activation/deactivation criteria (applicable times)

| Measurement Configuration | Activation/Deactivation criteria (Applicable Time) |
| --- | --- |
| SAT 1101 | T1 & T2 |
| SAT 1102 | T2 & T3 & T4 |
| SAT 1103 | T4 & . . . |
| . . . | . . . |
| SAT Bn | Tn-1 & Tn & . . . |

In the example of FIG. 11, the measurement configuration for SAT 1101 is activated at times T1 and T2, and deactivated at time T3, the measurement configuration for SAT 1102 is activated at times T2 and T3, and deactivated at time T1, and the measurement configuration for SAT 1103 is deactivated at times T1, T2, and T3, but activated at later times (e.g., T4 etc.).

In an example, the WTRU 1130 may autonomously activate/deactivate neighboring cell measurement configurations based on associated (de)activation criteria. In another example, the activation/deactivation of neighboring cell measurement configurations may be signaled by the network (e.g., via DCI from a network node such as a serving GEO satellite, a serving LEO satellite, and/or a ground network node). The activation/deactivation criteria includes the applicable time (i.e., the time that the corresponding satellite has a cell that covers the geographical location of the WTRU 1130), and thus is based on the satellite ephemeris and WTRU 1130 geo-location.

Figure 12:
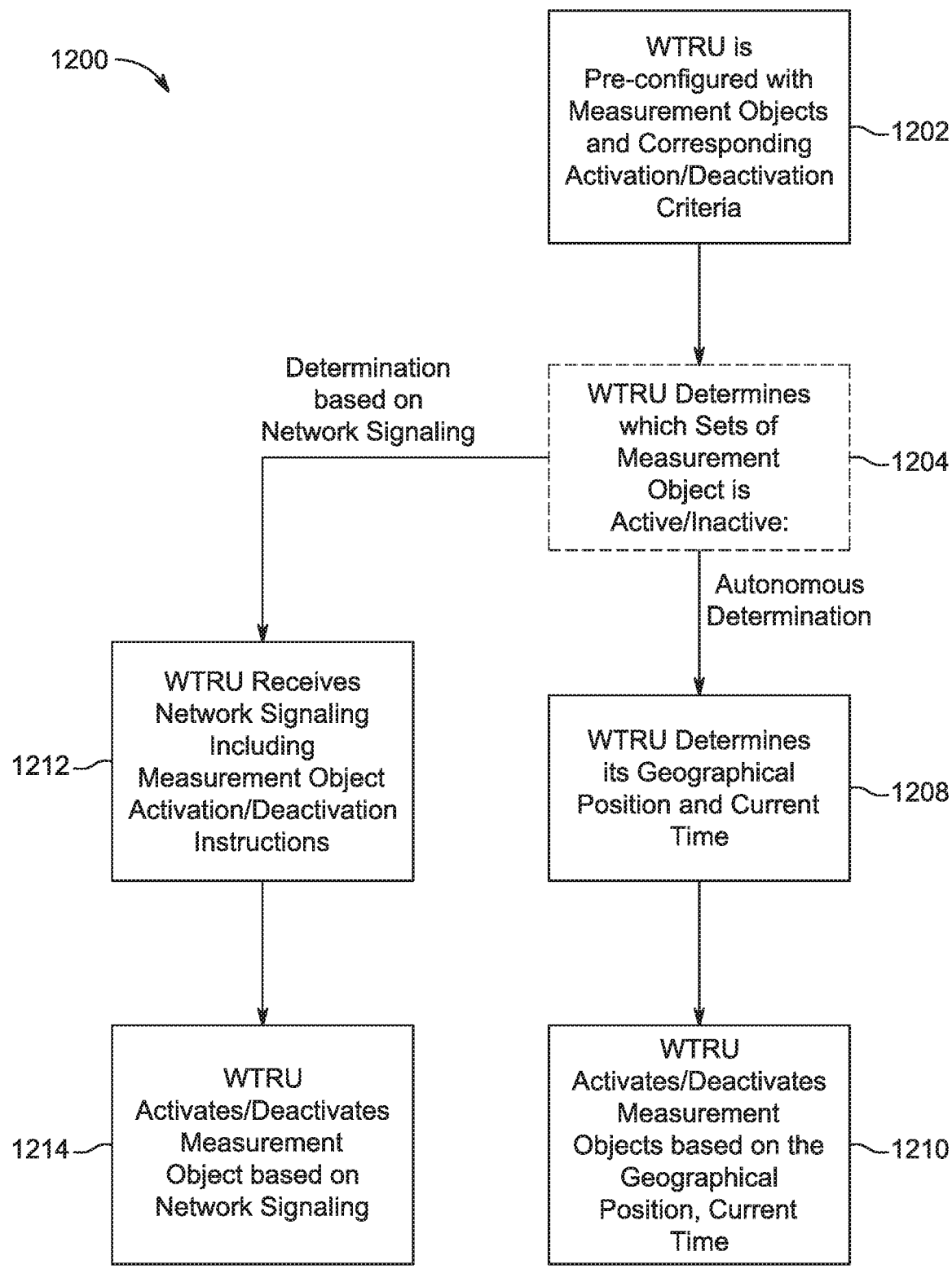
FIG. 12 shows a flow diagram of a measurement configuration management procedure that may be performed by a WTRU that is served by a NTN.

FIG. 12 shows a flow diagram of a measurement configuration management procedure 1200 that may be performed by a WTRU that is served by a NTN. At 1202, the WTRU may be preconfigured (based on signaling from a network node) with multiple measurement configurations (objects) associated with multiple satellites and corresponding activation/deactivation criteria for the measurement configurations. At 1204, the WTRU may determine which sets of measurement configurations are active/inactive either autonomously or based on network signaling. In a first example, at 1208, the WTRU makes an autonomous determination by determining the WTRU's current geographical position and the current time, then at 1210 activating/deactivating measurement configurations based on the current geographical position and the current time according to the activation/deactivation criteria. In an alternate example, at 1212, the WTRU receives network signaling including measurement configuration activation/deactivation instructions, and at 1214 the WTRU activates/deactivates measurement configurations based on network signaling.

Figure 13:
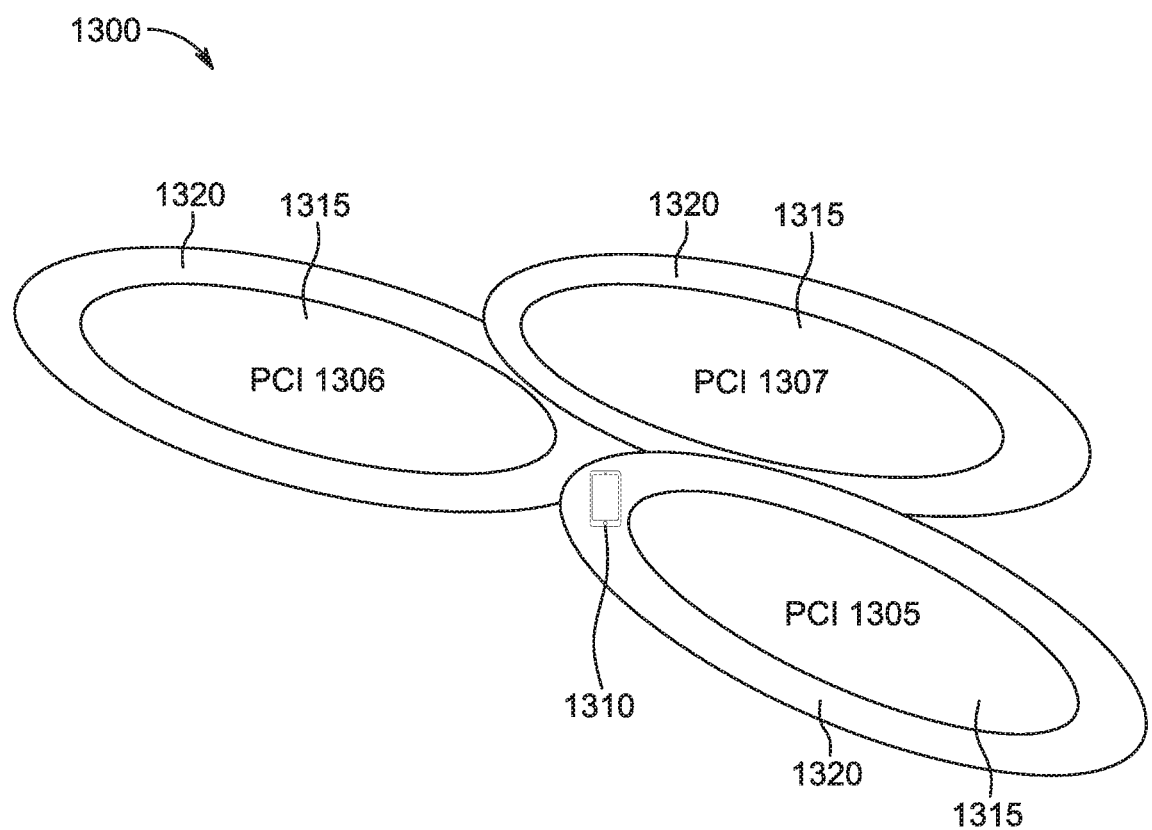
FIG. 13 shows a network diagram of an example NTN network serving a WTRU and showing example edge zones and center zones of serving and neighboring beams

Any of the following example measurement mechanisms and conditions may be used by WTRUs served by NTN to perform cell measurements. In an example, measurements may be performed based on a location of a WTRU within a beam spot. Each beam spot or satellite footprint may comprise an edge and a center zone. FIG. 13 shows a network diagram of an example NTN network 1300 serving a WTRU 1310 and showing example edge zones 1320 and center zones 1315 of serving and neighboring beams.

In an example, the WTRU may determine the delimitation of the edge and center zones based on a quality measurement threshold of the serving cell (e.g., signal-to-interference-plus-noise ratio (SINR), reference signal received quality (RSRQ), reference signal received power (RSRP)). In an example, the WTRU may receive signaling (e.g., RRC message) with the coordinates delimitating the edge and center zones of the beam spot(s)/satellite footprint(s). The WTRU may start measuring neighboring beam spots and satellites or any listed/detected cells when the WTRU enters the edge zone of the beam spot (e.g., the edge zone may be the last x km of the beam spot). The WTRU may report the measurements of any listed/detected cells satisfying pre-defined conditions.

In an example, the WTRU may be configured with a criteria for determining the start of neighboring cells measurement. The criteria may including any one or more of the following conditions: the measurement result quality (e.g., RSRP, RSRQ, SINR); and/or the location of the WTRU. For example, the WTRU may not perform any neighboring measurements if the serving cell SINR is greater than a threshold and the WTRU is located in a center zone. The condition may also be based on the mobility of the WTRU. For example, the WTRU may not perform any neighboring measurement if it is located in the center zone and has a mobility state which is slow or medium.

Any of the following example measurement report triggers and triggering conditions may be used by WTRUs served by NTN. The WTRU may be configured to report measurements on a condition or per event basis. The reporting conditions may be based on different or additional conditions to the measurement results. For example, the entering and leaving conditions of a reporting event may be based on any one or more of the following example conditions. An example condition may be based on the measurement results and location of the WTRU (e.g., an absolute location or a location in a beam spot). Another example condition may be based on the reference time delay of transmission. Another example condition may be based on the angle of arrival of the measured RS. Another example condition may be based on the observed time difference of arrival of different SSBs (e.g., the observed time difference of arrival (OTDA) between a serving and a neighboring cell).

Another example condition may be based on measurement results from more than two cells. For example, the WTRU may report measurements when the serving cell and the N best neighboring cells measurement results are below a threshold. This may assist the network for configuring handover (HO) in the case of moving beams when the network cannot determine a location of the WTRU with accuracy. Another example condition may be based on the WTRU reporting the observed measurement results during a given time window. For example, when the serving cell measurement has decreased by a certain amount (e.g., a predetermined percentage of the initial value) and the measurement result(s) of a neighboring cell or set of neighboring cells has increased by another amount.

Measurement reports may signal a quality of the planned target cell. In moving networks, the WTRU may be configured with a periodic change of serving beam spots or periodic handover to cope with the satellite mobility. However, as the WTRU may not be able to assess the quality of the planned target cell before the execution of the handover command or the beam change, the WTRU may need to evaluate the quality of the new serving cell quickly after the change or during the handover.

In an example, an association between multiple CD-SSBs with same the PCI (i.e. multiple beams from a common satellite) and a subset of physical random access channel (PRACH) resources and/or preamble indices may be configured by a set of parameters in system information. The WTRU may notify the satellite with the best beam associated with the best measured CD-SSB by using the corresponding PRACH resource for that CD-SSB. As the different SSBs from the different beams of the same satellite are from different frequency locations (i.e. multiple CD-SSBs for the same PCI), the association may require that the CD-SSB of the same satellite (i.e. one PCI) has different beam indices, which may be signaled to the WTRU in a handover command and/or system information transmission.

In an example, the WTRU may report in a message (e.g., message 3 (MSG3)) a quality and identity of the beams and/or PCI of the satellite, if the planned target cell quality is not suitable and the quality of a neighboring beam(s)/cell(s) is suitable. The suitability criteria may be based on a measurement threshold such as RSRP, RSRQ, SINR or received signal strength indicator (RSSI).

In an example, if a satellite comprises multiple beams with different PCIs, the WTRU may receive a handover command towards a group of PCIs (associated with the target satellite). The handover command may include an association between PRACH resources and/or preamble and different PCIs and may enable the WTRU to indicate that a beam/PCI has the best quality based on measurements. The WTRU may receive a message (e.g., message 2 (MSG2)) and the subsequent message may be received by the WTRU in the best DL beam indicated by the WTRU. In an example, the WTRU may be configured with measurement reporting events associated with the planned target beam/cell. In this case, the WTRU may report the quality of the planned target beam/cell and serving beams once the WTRU is being served by the target beam/cell and serving beams (e.g., not based on a time to trigger being applied or reporting event conditions being satisfied).

A reduction of measurement reporting may be used for moving beams. In an example, a WTRU may frequently be located in the edge zone of a cell due to the motion of the beams/satellites. As a result, measurement report triggering may cause unnecessary or ping pong handover. The WTRU may need to distinguish mobility due to serving cell movement and mobility due to its own experienced SINR/RSRQ and movement. For example, the WTRU may only consider the cells that are not configured as planned target cell(s) for event based measurement reporting. In another example, if the WTRU is aware of the ephemeris of the satellite, the WTRU may not trigger a measurement event in response to the triggering conditions of some events (e.g., an event where serving becomes worse than threshold). If the WTRU is aware of the planned target cell in the next instance of time, the WTRU may not trigger a measurement event in response to triggering conditions of some events for neighbor in the planned target cell (e.g., an event where a neighbor becomes an offset better than a threshold) or an event where a neighbor becomes better than a threshold).

Measurement parameters may be variable and a scaling of measurement configuration parameters may be applied. In an example, a time-to-trigger parameter for measurement may be scaled. A scaling value may be used to increase the value of time-to-trigger based on any one or more of the following example criteria. An example criteria may include the type of measured cell, for example whether the cell is a planned cell due to satellite mobility or a detected cell that should be reported quickly if not considered as a target cell by the network. Another example criteria may include the location of the WTRU inside the serving beam spot/satellite coverage (e.g., center zone or edge zone). For example, a more aggressive time-to-trigger a fast handover command transmission may be used when the WTRU is in an edge zone versus being located in a center zone, in the case that mobility is mainly due to satellite mobility.

As part of WTRU measurement reporting, measurement report quantities may include reporting of the footprint ID and/or geographical coordinates. For example, when a measurement report is sent to the network, the WTRU may piggyback additional measurements and/or indications such as the footprint ID, location coordinates or other information. For example, the WTRU may report how long a cell has been detected or measured as above a certain threshold. This may assist the network in assessing the location of the WTRU and/or configuring the WTRU with the next serving cell. The WTRU may include in measurement reports transmission delays or differential delays between multiple cells.

A WTRU may be configured to report location information based on periodic and/or event based triggers. For example, the periodicity of the location information reporting may be a function of WTRU speed. An example criteria for event-based trigger for location reporting may include when a WTRU has moved a certain distance (e.g., x meters) from the location where a previous location report was triggered. Another example of event-based trigger for location reporting may include when the reference signal measurement quantity of the serving cell is below a threshold and/or when the reference signal measurement quantity of the neighbor cell is above a threshold. Another example of location-based event trigger may include when the WTRU reference signal measurement quantity of a beam spot is above or below a threshold.

A WTRU may perform mobility state estimation based on counting the number of handovers performed during a period of time that may not be applicable in the case of moving satellites. For moving networks, the WTRU may determine the WTRU's mobility state by, for example, counting of the number of satellite footprints that the WTRU has crossed over a given period of time, and/or calculating a difference between the number of actual handovers and the number of planned cells.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, WTRU, terminal, base station, RNC, or any host computer.

What is claimed is:

1. A wireless transmit/receive unit (WTRU) comprising:
   a transceiver and a processor, wherein the transceiver and the processor are configured to:
   receive information for a serving cell in a non-terrestrial network, wherein the received information indicates coordinate information delimiting a first area of the serving cell, wherein the first area is defined by an edge that corresponds to a threshold distance from a reference location, and wherein the received information further includes measurement configuration information for neighboring cells in the non-terrestrial network; and
   on a condition that measured serving cell quality criteria are met:
      on a condition that a determined location of the WTRU is less than the threshold distance from the reference location, not perform neighboring cell measurements; and
      on a condition that the determined location of the WTRU is greater than or equal to the threshold distance from the reference location, measure a signal quality of at least one neighboring cell based on the received measurement configuration information.

2. The WTRU of claim 1, wherein the measurement of the signal quality of the at least one neighboring cell includes determining, for a received signal from the at least one neighboring cell, one of the following: signal-to-interference-plus-noise ratio (SINR), reference signal received quality (RSRQ), or reference signal received power (RSRP).

3. The WTRU of claim 1, wherein the transceiver and the processor are further configured to:
   report to a network node the measured signal quality of the at least one neighboring cell.

4. The WTRU of claim 1, wherein the information for the serving cell is received in a radio resource control (RRC) message.

5. The WTRU of claim 1, wherein the transceiver and the processor are further configured to:
receive a broadcast message including configuration information indicating at least one measurement threshold, wherein the measured serving cell quality criteria is based on the at least one measurement threshold.

6. The WTRU of claim 1, wherein the serving cell and the at least one neighboring cell are satellite cells provided by a plurality of satellites.

7. The WTRU of claim 6, wherein the plurality of satellites have predictable paths of movement.

8. The WTRU of claim 1, further comprising a global positioning system (GPS) chipset, wherein the transceiver and the processor are further configured to receive, from the GPS chipset, information indicating the location of the WTRU.

9. The WTRU of claim 1, wherein the transceiver and the processor are further configured to receive, from a base station, information indicating the location of the WTRU.

10. The WTRU of claim 1, wherein the information for the serving cell is broadcast in a system information block (SIB).

11. The WTRU of claim 1, wherein the measured serving cell quality criteria are based on a measurement of reference signal received power (RSRP).

12. The WTRU of claim 1, wherein the received information further includes second measurement configuration information for channel state information reference signals (CSI-RSs) of the neighboring cells.

13. A method performed by a wireless transmit/receive unit (WTRU), the method comprising:
receiving information for a serving cell in a non-terrestrial network, wherein the received information indicates coordinate information delimiting a first area of the serving cell, wherein the first area is defined by an edge that corresponds to a threshold distance from a reference location, and wherein the received information further includes measurement configuration information for neighboring cells in the non-terrestrial network; and
on a condition that measured serving cell quality criteria are met:
on a condition that a determined location of the WTRU is less than the threshold distance from the reference location, not performing neighboring cell measurements; and
on a condition that the determined location of the WTRU is greater than or equal to the threshold distance from the reference location, measuring a signal quality of at least one neighboring cell based on the received measurement configuration information.

14. The method of claim 13, wherein measuring the signal quality of the at least one neighboring cell includes determining, for a received signal from the at least one neighboring cell, one of the following: signal-to-interference-plus-noise ratio (SINR), reference signal received quality (RSRQ), or reference signal received power (RSRP).

15. The method of claim 13, further comprising:
reporting to a network node the measured signal quality of the at least one neighboring cell.

16. The method of claim 13, wherein the information for the serving cell is received in a radio resource control (RRC) message.

17. The method of claim 13, further comprising:
receiving a broadcast message including configuration information indicating at least one measurement threshold, wherein the measured serving cell quality criteria is based on the at least one measurement threshold.

18. The method of claim 13, wherein the serving cell and the at least one neighboring cell are satellite cells provided by a plurality of satellites.

19. The method of claim 18, wherein the plurality of satellites have predictable paths of movement.

20. The method of claim 13, wherein the WTRU comprises a global positioning system (GPS) chipset, and the location of the WTRU is determined based on information generated by the GPS chipset.

21. The method of claim 13, further comprising receiving, from a base station, information indicating the location of the WTRU.

22. The method of claim 13, wherein the information for the serving cell is broadcast in a system information block (SIB).

23. The method of claim 13, wherein the measured serving cell quality criteria are based on a measurement of reference signal received power (RSRP).

24. The method of claim 13, wherein the received information further includes second measurement configuration information for channel state information reference signals (CSI-RSs) of the neighboring cells.

* * * * *